United States Patent [19]

Kolberg et al.

[11] Patent Number: 5,087,373
[45] Date of Patent: Feb. 11, 1992

[54] PROCESS FOR REMOVING TITANIUM AND ZIRCONIUM FROM AQUEOUS SOLUTIONS

[75] Inventors: Thomas Kolberg, Heppenheim; Horst Gehmecker, Hofheim; Joachim Heitbaum, Bad Homburg, all of Fed. Rep. of Germany

[73] Assignee: Metallgesellschaft Aktiengesellschaft, Frankfurt am Main, Fed. Rep. of Germany

[21] Appl. No.: 707,122

[22] Filed: May 29, 1991

[30] Foreign Application Priority Data

Jun. 11, 1990 [DE] Fed. Rep. of Germany ....... 4018647

[51] Int. Cl.$^5$ .............................................. C02F 9/00
[52] U.S. Cl. .................................. 210/665; 210/667; 210/684; 210/685; 210/724
[58] Field of Search ............... 210/665, 667, 684, 685, 210/686, 702, 724

[56] References Cited

U.S. PATENT DOCUMENTS 4,839,101  6/1989  Kolarik et al. ...................... 210/665

Primary Examiner—Ivars Cintins
Attorney, Agent, or Firm—Herbert Dubno; Andrew M. Wilford

[57] ABSTRACT

In a process of removing complexly bound titanium and/or zirconium from acid aqueous solutions the solution which contains the complexly bound titanium and/or zirconium is conditioned in that its pH value is raised to at least 8, any precipitate thus formed is removed and the solution thus treated is passed through an ion exchange plant comprising a cation exchange material and an anion exchange material. The solution is preferably passed through an ion exchange plant which contains the cation exchange material in the $H^+$ form and the anion exchange material in the $OH^-$ form. The process is particularly intended for the treatment of solutions obtained by the chemical treatment of surfaces preferably of metals, which solutions contain titanium and/or zirconium in the form of fluoro complexes.

10 Claims, No Drawings

PROCESS FOR REMOVING TITANIUM AND ZIRCONIUM FROM AQUEOUS SOLUTIONS

FIELD OF THE INVENTION

Our present invention relates to a process for removing complexly bound titanium and/or zirconium from acid aqueous solutions and the use of this process for treatment of solutions used for a chemical treatment of surfaces.

BACKGROUND OF THE INVENTION

Complex compounds of titanium and/or zirconium are used in many industrial fields. In the chemical surface treatment of metals, bright or previously conversion-coated surfaces are passivated, e.g. with solutions of complex fluorides of titanium and/or zirconium in order to achieve a higher resistance to corrosion and a stronger adherence of paints consisting of subsequently applied organic coatings.

Such passivating aftertreatments are followed, as a rule, by a rinsing with de-ionized water. In that case, the passivating agent is carried over by the workpieces into that rinsing bath so that a continuous or discontinuous discarding of rinsing water is required. Legal and environmental requirements necessitate removal of titanium and zirconium before such water is discharged into the environment.

OBJECT OF THE INVENTION

It is an object of the invention to provide for the removal of complexly bound titanium and/or zirconium from aqueous solutions an economical process which makes re-usable water available that is as pure as possible.

DESCRIPTION OF THE INVENTION

This object is achieved by first conditioning the solution which contains the complexly bound titanium and/or zirconium by raising its pH value to at least 8. Any precipitate thus formed is removed and the solution thus treated is passed through an ion exchange plant comprising a cation exchange material and an anion exchange materials.

The pH value of the solution is desirably raised not in excess of 13 in the conditioning stage. A higher pH value will not produce additional results and involves only an unnecessarily high ion content of the solution.

According to a further preferred feature of the invention, sodium hydroxide, potassium hydroxide, sodium carbonate, potassium carbonate, ammonium hydroxide and/or calcium hydroxide can be employed to raise the pH value.

In dependence on the concentration of complexly bound titanium and/or zirconium in the treated solution, the raising of the pH value to at least 8 will result in the formation of a precipitate which is removed in conventional manner, e.g. by means of a filter, a settling tank, an inclined-tray clarifier or a centrifuge.

Thereafter the solution is fed to the ion exchange plant, which may contain the ion exchange materials substantially in any form that is desired. But it will be particularly desirable to pass the solution through an ion exchange plant which contains the cation exchange material in the H+form and the anion exchange material in the OH−form. In that case pure water will be obtained, which can be re-used. In that preferred embodiment of the invention the cation exchange material is regenerated in a manner known per se, e.g. with eluants which contain hydrochloric or sulfuric acid, and the anion exchange material is regenerated by means of an eluant which contains sodium hydroxide.

That part of the process can be carried out in a particularly favorable manner if an eluant that contains sulfuric acid is employed because the salt concentration in the purified water can then substantially be decreased by following neutralization with calcium hydroxide and/or milk of lime with precipitation of low solubility calcium sulfate (gypsum).

The process in accordance with the invention can particularly be used to treat solutions formed by the chemical processing surfaces, particularly of metals. Such solutions may consist of rinsing solutions which have been used for a water rinse of conversion coatings or of conversion coatings passivated by a post-rinse, or of spent solutions used to produce conversion coatings or for a passivating post-rinse of conversion coatings. To special advantage the process is applicable to such solutions which contain titanium and/or zirconium in the form of fluoro complexes.

SPECIFIC EXAMPLE

The invention will be explained in greater detail and by way of example with reference to the following example.

EXAMPLE

A rinsing water obtained by a water rinse of phosphate coatings after a passivating post-rinse had the following composition:
14 mg/l zirconium
18 mg/l fluoride
2 mg/l aluminum
2 mg/l ammonium
10 mg/l zinc
4 mg/l manganese
2 mg/l nickel
10 mg/l phosphate (calculated as $P_2O_5$)
pH value: 4.4
Conductivity: 60/$\mu$S/cm A 40% sodium hydroxide solution was added to raise the pH value to 9.5 and the resulting precipitate was filtered off by means of a bag filter having a pore size of 1/$\mu$m. The resulting solution was consecutively passed over a cation exchange material (H+form) and an anion exchange material (OH−form). The separation was carried out under the following conditions:
Temperature: 20+/−1° C.
Column volume: 80 dm$^3$
Flow rate: 0.1 dm$^3$/dm$^2$-min
Conductivity of the
effluent solution: <2 /$\mu$S/cm The ion exchange material were regenerated by means of a 15% sulfuric acid solution (for the cation exchange material) and a 5% sodium hydroxide solution (for the anion exchange material).

During the experiment consisting of 50 absorption-desorption cycles the capacity and the exchange rate of the ion exchange columns were constant within the measuring accuracy.

The cation exchange resin was Lewatit ®S 100 in the H+-form (Bayer AG), based on sulfonated polystyrol, at least 90% of the resin being of a particle size of 0.3 to 1.3 mm. The anion exchange resin was Lewatit ®M 600 in the OH−-form based on a quarternary ammonium compound of polystyrol, at least 90% of the resin being of a particle size of 0.3 to 1.0 mm.

We claim:

1. A process for removing complexes of titanium and/or zirconium from an acid aqueous solution, comprising the steps of:
   (a) conditioning an acid aqueous solution which contains complexes of titanium and/or zirconium by raising its pH value to at least 8;
   (b) removing any precipitate thus formed; and
   (c) thereafter passing the solution having its pH thus raised through a cation exchange material and an anion exchange material.

2. The process defined in claim 1 wherein the pH value of the solution is raised to a value up to 13.

3. The process defined in claim 1 wherein said pH is raised by adding to said aqueous solution sodium hydroxide, potassium hydroxide, sodium carbonate, potassium carbonate, ammonium hydroxide or calcium hydroxide.

4. The process defined in claim 1 wherein the solution is passed through the cation exchange material in the $H^+$ form and the anion exchange material in the $OH^-$ form.

5. The process defined in claim 1 wherein said solution is formed by a chemical treatment of a surface.

6. The process defined in claim 5 wherein said surface is a metal surface.

7. The process defined in claim 5 wherein said solution contains titanium and/or zirconium in the form of fluoro complexes.

8. The process defined in claim 7 wherein the pH value is raised to a value up to 13.

9. The process defined in claim 8 wherein the pH value of the solution is raised by adding to said solution an alkaline substance selected from the group which consists of sodium hydroxide, potassium hydroxide, sodium carbonate, potassium carbonate, ammonium hydroxide, calcium hydroxide and mixtures thereof.

10. The process defined in claim 9 wherein the cation exchange material is in the $H^+$ form and the anion exchange material is in the $OH^-$ form.

* * * * *